3,351,668
PRODUCTION OF PARAFORMALDEHYDE
Helmut Junkermann and Friedrich Löffler, Frankfurt am Main, Germany, assignors to Deutsche Gold- und Silber-Scheideanstalt vormals Roessler, Frankfurt am Main, Germany
No Drawing. Filed July 16, 1964, Ser. No. 383,208
Claims priority, application Germany, Aug. 10, 1963, D 42,220
2 Claims. (Cl. 260—615.5)

The present invention relates to a process for the production of an easily soluble paraformaldehyde product which is obtained in the form of beads.

In general, paraformaldehyde is produced by the dehydration of aqueous formaldehyde solutions. Such dehydration can be carried out by the application of a vacuum or by distillation with organic liquids which form low boiling azeotropic mixtures with water. According to other processes partial condensation of formaldehyde vapors is involved.

In carrying out these processes the so-called formaldehyde-preconcentrate which has about a 70% by weight and more formaldehyde content is obtained as the product of the first dehydration step. Such preconcentrate at the temperatures at which it is produced, namely, over 70° C., presents a rather mobile, depending upon its formaldehyde content, more or less clear melt. When such preconcentrate is cooled to room temperature, again depending upon its formaldehyde content, it forms a more or less viscous, gelatinous to solid opaque mass. The latter, however, cannot be remelted without taking special measures.

When the production of paraformaldehyde from the preconcentrate is carried out in such a way that the further concentration is carried out under higher temperatures, large formaldehyde losses occur. This also is the case when the liquid preconcentrate is allowed to run over rotating cooled drums, as is customary in the production of paraformaldehyde flakes, upon which the mass solidifies to a plastic film which can be scraped off.

U.S. Patent 2,704,765 describes a process for the production of paraformaldehyde in which a gaseous mixture of 60 to 90% by weight of formaldehyde with inert diluents such as steam, methanol, methane and/or carbon oxides is introduced into a non-solvent organic liquid which serves as a cooling medium and also contains a basic or acid reacting substance as a condensation catalyst. In this instance the paraformaldehyde is produced in the form of a pasty mass which must still be subjected to an intensive drying process.

It is an object of the present invention to provide a process for the production of paraformaldehyde avoiding the aforementioned difficulties which results in a readily soluble and readily reactive paraformaldehyde in the form of beads.

This object is achieved according to the invention by concentrating an aqueous formaldehyde solution to a concentration of about 70 to 85% by weight and introducing the hot melt of the preconcentrate thus obtained in the form of a thin stream into a liquid which is inert with respect to formaldehyde and which is maintained in turbulent motion and at a temperature which is at least 50° C. below that of the melt being introduced. Preferably, the thin stream of melted preconcentrate is introduced into the stirred cooling liquid from a nozzle from which it issues at a moderately raised pressure of, for example, 1.01 to 1.2 atmospheres gauge pressure. The paraformaldehyde is thereby obtained in the form of fine beads which rapidly settle to the bottom of the cooling liquid after their formation and can easily be separated from the cooling liquid, for example, by filtering, decanting or centrifuging. Preferably, the boiling point of the cooling liquid is below 120° C., so that the cooling liquid still adhering to the paraformaldehyde beads, after separation from the main body of cooling liquid, can be removed by evaporation at low temperatures, if desired, in an air stream or under vacuum with only very low formaldehyde loss. Examples of suitable cooling liquids, for instance are: benzene, toluene, cyclohexane or ligroin (petroleum ether). After drying the formaldehyde content of the paraformaldehyde beads produced according to the invention is between 85 and 95%, mostly between 88 to 92% by weight.

The paraformaldehyde beads produced according to the invention, in comparison to flaked paraformaldehyde and other usual commercial paraformaldehyde products, are distinguished especially by their freedom from dust, good flow characteristics, high solubility in water and stability on aging.

The following examples will serve to illustrate the process according to the invention.

EXAMPLE 1

107 g. of a formaldehyde preconcentrate with a 76% by weight formaldehyde content heated to 106° C. were introduced under moderate pressure in a thin stream into a beaker containing 500 cc. of vigorously stirred benzene at 22° C. from a nozzle 1.1 mm. in diameter arranged 4 cm. above the upper surface of the benzene. The benzene warmed up to 35° C. during such introduction. The movement of the benzene caused the stream of molten preconcentrate to be torn into droplets which solidified and settled to the bottom of the beaker in the form of beads 0.4 to 1.5 mm. in diameter. After the paraformaldehyde beads had been filtered off and dried in air, 83.6 g. of paraformaldehyde with a 90% by weight formaldehyde content were obtained.

EXAMPLE 2

21.5 g. of a formaldehyde preconcentrate with a 80% by weight formaldehyde content heated to 103° C. were introduced into a thin stream into moderately stirred ligroin (B.P. 80 to 100° C.) at 25° C. from a nozzle 1.4 mm. in diameter arranged 12 cm. above the surface of the ligroin. White paraformaldehyde beads were formed which immediately settled to the bottom of the ligroin. The supernatant ligroin was poured off and the beads dried. 17.0 g. of paraformaldehyde with a formaldehyde content of 88.5% by weight were obtained.

We claim:
1. A process for the production of paraformaldehyde in the form of beads which comprises introducing from a nozzle a thin stream of molten formaldehyde preconcentrate containing 70 to 85% by weight of formaldehyde obtained by the concentration of an aqueous formaldehyde solution at a moderately raised pressure into an inert liquid hydrocarbon having a boiling point below 120° C. maintained in turbulent motion and at a temperature at least 50° C. below that of the melt being introduced, said nozzle being spaced above the surface of the hydrocarbon.

2. The process of claim 1 in which said hydrocarbon is selected from the group consisting of benzene, toluene, cyclohexane and ligroin.

References Cited
UNITED STATES PATENTS
2,529,622  11/1950  Michael _____ 260—615.5 X
2,593,862  4/1952  Eickmeyer _____ 260—615.5
2,704,765  3/1955  Smithson _____ 260—615.5 X LEON ZITVER, Primary Examiner.
H. T. MARS, Assistant Examiner.